Nov. 29, 1927.
H. J. MURPHY
PRESSURE LUBRICATING SYSTEM AND APPARATUS
Original Filed Feb. 1, 1923    2 Sheets-Sheet 1
1,651,218
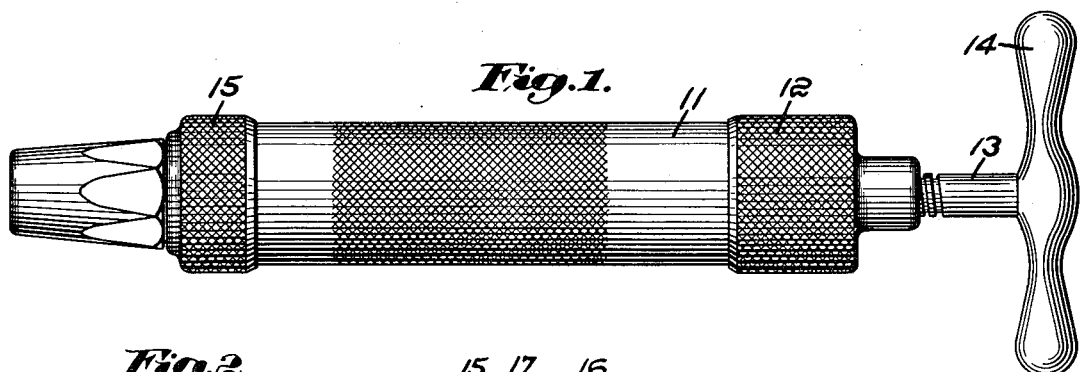
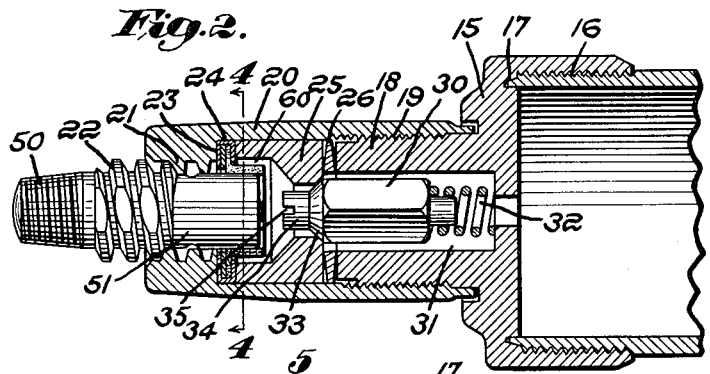
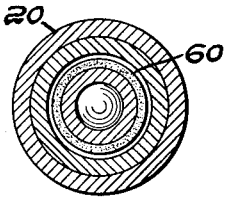
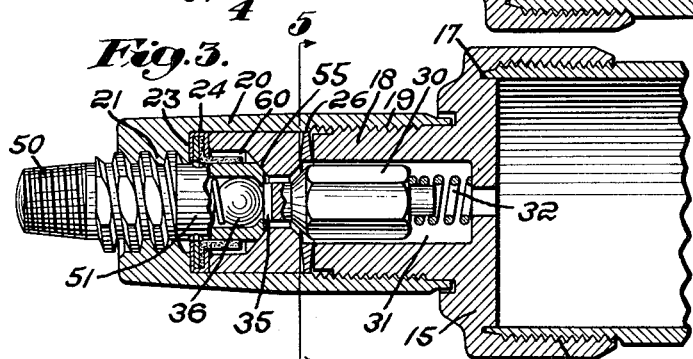
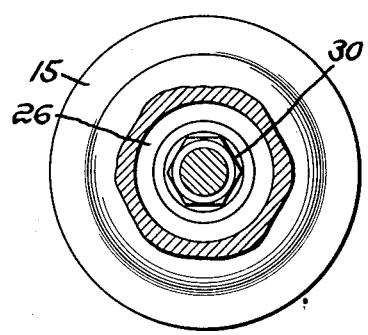
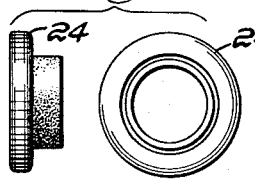
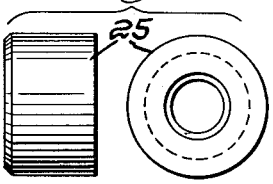
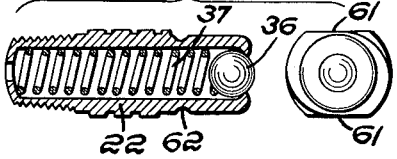
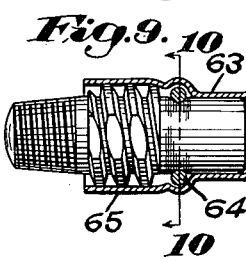
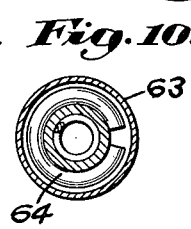
Inventor:
Howard J. Murphy,
by Emery Booth Janney + Varney
Attys.

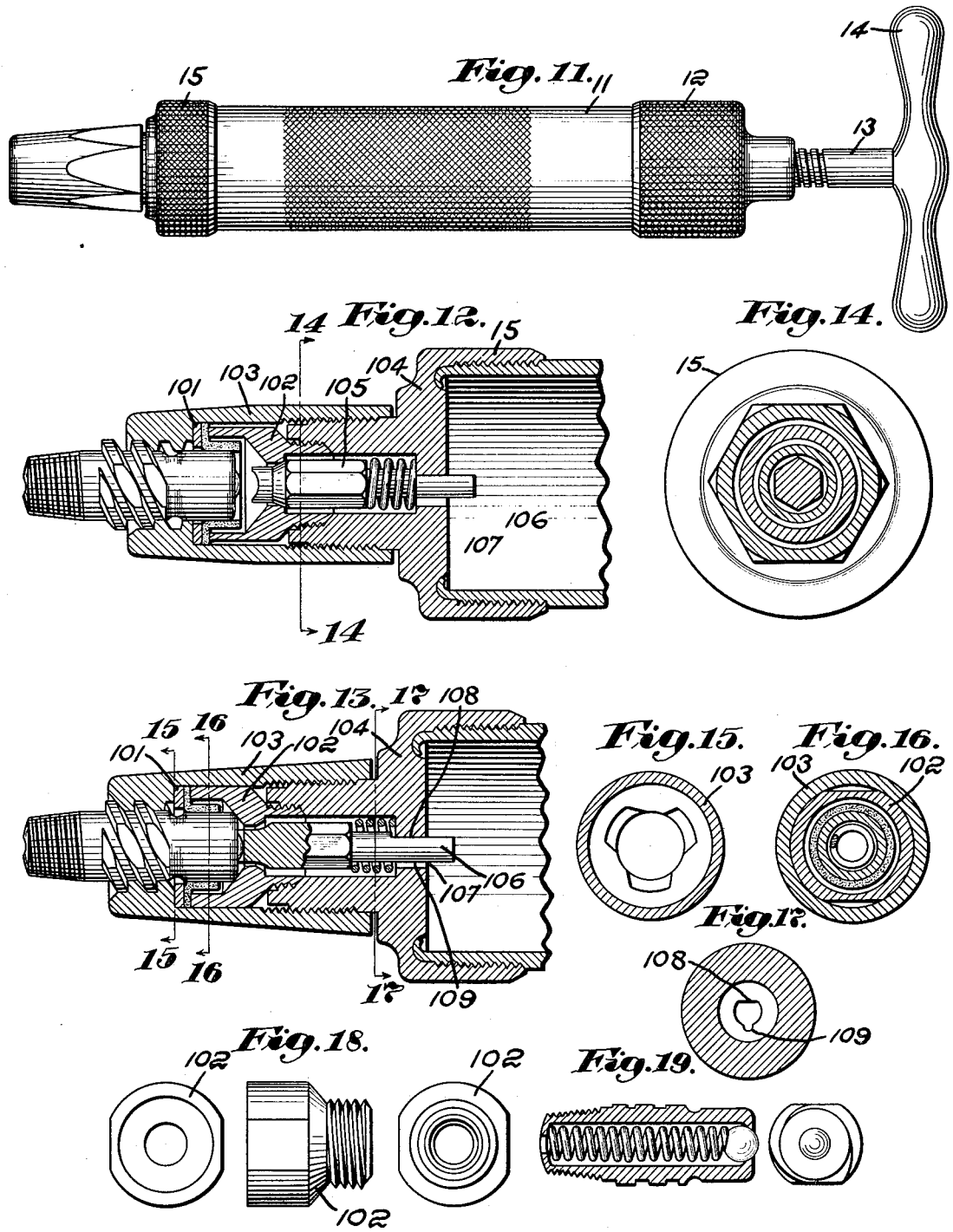

Patented Nov. 29, 1927.

1,651,218

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

PRESSURE LUBRICATING SYSTEM AND APPARATUS.

Original application filed February 1, 1923, Serial No. 616,302. Patent No. 1,637,236, dated July 26, 1927. Divided and this application filed February 11, 1925. Serial No. 8,586.

This invention pertains to improvements in pressure lubricating systems and apparatus of the type wherein a single lubricant-expelling element is adapted successively to engage a plurality of lubricant-receiving nipples. It is among the objects of the invention to provide a pressure lubricating system simple in construction and efficient in operation.

The application is a division of my prior application, Serial No. 616,302, filed February 1st, 1923.

In the drawings, which show preferred forms of my invention:

Figure 1 is a side elevation of a lubricant-expelling gun;

Fig. 2 is a central, longitudinal section through the nozzle of the gun shown in Fig. 1, with the lubricant-receiving nipple partially engaged in said nozzle, being partly in elevation;

Fig. 3 is a view similar to Fig. 2, but showing the lubricant-receiving element fully entered in the nozzle and with the valve in the nozzle opened to permit discharge of lubricant;

Fig. 4 is a section on the line 4—4 of Fig. 2;

Fig. 5 is a section on the line 5—5 of Fig. 3;

Fig. 6 includes side and end elevations of the preferred form of sealing washer to prevent leakage of lubricant between the nozzle and nipple, while lubricant is supplied to the latter under pressure;

Fig. 7 includes a side and end elevation of a part of the nozzle, providing a valve seat, an abutment for engagement by the head of the nipple and a part for holding the sealing washer in position;

Fig. 8 includes a longitudinal section, through a preferred form of nipple and an end elevation thereof;

Fig. 9 is a side elevation of the nipple showing a section of the preferred form of protecting cap therefor;

Fig. 10 is a section on the line 10—10 of Fig. 9, being partly in elevation;

Figs. 11 through 19 illustrate a later development of my invention wherein:

Fig. 11 is a side elevation of a lubricant-expelling gun;

Fig. 12 is a central, longitudinal section through the nozzle of the gun shown in Fig. 11, with the lubricant-receiving nipple partially engaged in said nozzle, being partly in elevation, showing a triple thread on the nipple, and a valve and valve seat held in assembled relation independently of the nozzle sleeve;

Fig. 13 is a view similar to Fig. 12, but showing the lubricant-receiving nipple fully entered in the nozzle and with the valve in the nozzle opened to permit discharge of lubricant;

Fig. 14 is a section on the line 14—14 of Fig. 12;

Fig. 15 is a section on the line 15—15 of Fig. 13;

Fig. 16 is a section on the line 16—16 of Fig. 13;

Fig. 17 is a section on the line 17—17 of Fig. 13, the valve and spring omitted;

Fig. 18 includes a side and two end elevations of a part of the nozzle, providing a valve seat, an abutment for engagement by the head of the nipple, a part for holding the sealing washer in position, and adapted to hold the valve in assembled relation independently of the nozzle sleeve; and Fig. 19 includes a section and an end elevation of a triple thread nipple.

In both forms of my invention illustrated, I have shown lubricant-receiving nipples presenting plural threads for engagement with cooperating threads on the nozzle of a lubricant-expelling gun, the thread shown in the first embodiment of my invention being double. In the later embodiment, such thread is triple, to provide for coupling with less turning of the gun, to provide easier initial engagement of the threads and to provide, under high pressure in the gun, for the initiation of uncoupling movement and closure of the valve, by pressure of the lubricant in the barrel when torque is not applied, and this quite independently of any manual turning of the gun in uncoupling direction.

In both embodiments of my invention, I have provided the nipple at the lubricant-securing end with a generally cylindrical projection sufficient to support the gun, when the threads of the nozzle are passed over the projection, and to prevent possible mutilation of the threads of either the nipple or nozzle. Cooperating with each embodiment of my invention, I have shown above the nipple-engaging threads in the nozzle, an aligning portion for engagement with the end of the cylindrical portion on the nipple prior to engagement of the cooperating male and female threads, thereby to oppose cross-threading or other injurious engagement of such threads. I prefer, as shown, that this aligning portion be a washer immediately above the female threads in the end of the nozzle and immediately below a sealing part of the "hat washer" type, such sealing part adapted to surround the cylindrical portion of the cooperating nipple and to be pressed thereagainst by the pressure of the lubricant. In both embodiments of my invention illustrated, this "hat washer" is held in position by being pressed against an overlying annular end by pressure produced by screwing on the nozzle sleeve which carries or provides the female threaded portion of the coupling.

While for some purposes the valve need not be removable except from the interior of the head of the gun, I prefer that it be removable independently of the head of the gun, and to this end I have shown in both embodiments of my invention illustrated a valve seat which holds the valve assembled and which is removable from the front of the head of the gun. This valve seat may provide the annular end holding the "hat washer" in position, and also may conveniently provide an abutment to limit the entrance of the nipple within the nozzle, which may in some degree act as a seal against the end of the nipple, though I prefer to avoid the use of any yielding gasket at this point and rely primarily on the "hat washer" to prevent leakage.

I will now describe in detail the form of my invention shown in Figures 1 through 10 of the drawings.

Referring to Fig. 1 through 10 of the drawings, and to the first form of my invention selected for illustrative purposes, I have shown a lubricant-expelling gun including a barrel 11, rear head 12, into which is threaded a plunger stem 13 carrying the usual plunger interiorly of the barrel 11, and a handle 14. At the discharge end of the gun, I have shown a front head 15 secured to threads 16 to the exterior of the barrel 11 and presenting a recess 17 into which is introduced a sharpened end edge of the barrel 11 to provide a tight seal between the head 15 and barrel 11. The preferred form of front head herein illustrated includes a forwardly projecting portion 18 exteriorly threaded at 19 to engage with internal threads on a nozzle sleeve 20. The nozzle sleeve 20 carries, preferably integral therewith, female threads 21, preferably of steep pitch and herein shown as double, to engage corresponding male threads 22 on the lubricant-receiving nipple. Between the projection 18 of the front head 15 and the threaded portion of the nozzle sleeve 20, I have shown a shoulder 23 on the nozzle sleeve which engages and holds in position an aligning part, hereinafter more fully described, a sealing washer 24, a valve seat portion 25 and a sealing disc 26. The front head 15 is cored to receive a valve 30 having a polygonal portion whose corners engage the rounded inner wall of the valve guide chamber 31, the valve being pressed forwardly toward its seat by a valve spring 32 bearing at one end against the front head and at the other against the valve. The seating portion 33 of the valve is shown in Fig. 2 as bearing against the valve seat on the part 25. while in Fig. 3 these parts are separated to permit passage of lubricant. The valve opening end 34 may be slotted at 35 to permit passage of the lubricant to the lubricant-receiving opening in the end of the lubricant-receiving nipple. Such lubricant-receiving opening is preferably ordinarly closed by a ball check 36, which may be opened by the pressure of the lubricant, being normally pressed toward its seat by a nipple spring 37.

Assuming the parts carried by the front head 15 to be disassembled, the method of assembling the first embodiment of my invention illustrated is as follows. The valve part 30 with the valve spring 32 assembled therewith is dropped into the valve guide chamber 31. The aligning part, the sealing washer 24, the valve seat part 25 and sealing disc 26 may then be dropped in the order named within the nozzle sleeve 20, and the nozzle sleeve 20 screwed onto the projecting end 18 of the front head. When the screwing together of these parts is completed, the assembling operation is completed. Assuming the barrel 11 to be filled with lubricant, and assuming the lubricant-receiving nipple to be secured to its carrying part on the apparatus to be lubricated as by screwing the threaded end 50 thereof into a correspondingly threaded aperture, the lubricant-expelling gun may be grasped by the handle 14 and the nozzle thereof introduced over the smooth end 51 of the lubricant-receiving nipple, which, contacting with the inner surface of the female threads on the nipple, will guide the nozzle until the end of the nipple enters the aligning part, herein shown as a washer. This aligning part has an aperture fitting the exterior of the smooth end of the nipple sufficiently closely normally to preclude cross-threading of the male threads on the nipple with the female threads on the nozzle. The relatively steep pitch threads, double in the first embodiment of my invention, are very strong and render engagement easy and rapid, though the triple threads shown in the second embodiment of my invention are superior not only in these respects but in other respects hereinafter referred to. Where the barrel of the gun rigidly carries the nozzle, the end 51 of the nipple and the threads of the nozzle are sufficient to carry the weight of the gun, though full of lubricant, and where sufficient entrance of the nipple is effected to provide entrance of the head thereof within the aligning part, sufficient bearing is provided not only to hold this weight but to provide substantial alignment even though the tendency to bind is increased by transverse pressure of the operator's hand on the end of the barrel or handle, in a position providing of course a leverage very unfavorable to alignment of the parts.

If now, the handle 14 be turned in clockwise direction, the whole lubricant-expelling gun will be turned in clockwise direction so that the female threads 21 on the nozzle will engage the male threads 22 on the nipple and draw the nozzle over the nipple, forcing the smooth portion 51 of the nipple through the flexible sealing washer 24, the latter being of the type generally known as a "hat washer." When this screwing together operation has been carried to a sufficient point, the projection 34 on the valve in the nozzle will abut against the lubricant-receiving end of the nipple and the valve will be opened, as shown in Fig. 3, until the end of the nipple abuts against the stop shoulder 55. The valve now being opened, further clockwise movement of the handle of the gun will force lubricant past the valve, thereby opening the ball check 36 and permitting passage of lubricant to the part to be lubricated.

The lubricant expelled may, if desired, be under great pressure, but no substantial leakage between the nipple 51 and the nozzle is possible because pressure on the exterior of the hat washer holds the latter in such close contact to the smooth cylindrical portion of the nipple as to preclude leakage. No leakage past the threads 19 takes place because the sealing washer 26, which is preferably of relatively soft metal such as brass, precludes such leakage. In the first embodiment of my invention, all parts of the nozzle except the sealing washer 26 are preferably of steel and the nozzle sleeve 20 and valve seat part 25 are preferably case hardened.

When the lubricant-expelling gun is to be removed from the nipple, turning of the handle 14 in counterclockwise direction will withdraw the nozzle from over the nipple, gradually permitting closure of the valve. The valve reaches its seat before the hat washer 24 is clear of the cylindrical portion 51 of the nipple and all pressure on the nipple is relieved by enlargement of the chamber between the head of the nipple and valve before there is any opportunity afforded for leakage. I preferably provide a relatively large aperture 60 behind the hat leather 24, not only to admit pressure behind the leather to insure a tight seal, but also, where a relatively light lubricant such as oil is used as distinguished from grease, to catch surplus oil passing through the valve during the instant when valve-closing operation is taking place.

That portion of the nipple presenting the steep pitch threads 22 is preferably provided with flattened portions 61, 61 to admit of the application of a suitable wrench to screw the nipple into its carrying part. The nipple is also preferably provided with a neck 62 for engagement by suitable means associated with a dust-excluding cap 63, which may be formed of a single sheet of metal, as shown in Fig. 9, enclosing a resilient ring-like spring 64 for engagement in said neck 62 when the cap is fully applied to the nipple. The skirt portion 65 protects the threads of the nipple from dust and mud, while an enlarged head 66 provides a finger hold permitting easy removal.

In the later embodiment of my invention shown in Figs. 11 through 19, the operation of the parts is generally the same as in the first embodiment thereof. There are, however, substantial advantages. The triple thread provides easier engagement than the double thread, and the steeper pitch reduces the turning necessary to effect coupling and opening of the valve, while also providing (at higher pressures) automatic initiation of uncoupling movement (when torque is removed) to the point where the valve has closed, this arising from the pressure of the lubricant on the valve pressing the nozzle away from the nipple with sufficient force to overcome the friction on the threads between the nozzle and nipple. The aligning or centering portion 101 is the same as in the earlier figures, and provides a seat for a similar "hat washer". The valve seat 102 and parts associated therewith are held in position independently of the nozzle sleeve 103, being screwed to the front head 104, which it is obvious may if desired be integral with the barrel of the gun. Thus the hat leather may, if desired, be replaced without disturbing the valve parts. The valve 105 differs from the one earlier described in that means are provided to preclude turning thereof on its seat, such means preferably including a rearwardly extending non-circular portion 106, herein shown as flattened on one side 107 to engage a flattened side 108 (Fig. 17) of a guiding hole in the head 104, while the grease may pass to the valve proper through suitable apertures typified by the lateral groove 109. With this construction, the valve and valve seat may be assembled with the front head and a very superior fit provided merely by pounding lightly on the rear end of the stem 106. This seat, once provided, will be tight so long as the valve seat 102 is not subsequently turned, and there is normally no occasion for subsequently turning this.

While I have shown and described specific embodiments of my invention, it will be understood that considerable changes may be made without departing from the scope thereof, which is best defined in the following claims.

I claim—

1. A lubricant-receiving nipple comprising, in combination, a body having a threaded portion adjacent its discharge end for engagement with a nipple-supporting part, said body having its portion of greatest diameter adjacent the center of the nipple, said portion of greatest diameter presenting relatively rugged, steep pitch triple threads, and said body adjacent the lubricant-receiving end of the nipple having a portion presenting a relatively smooth peripheral surface of sufficient length for engagement with a sealing washer on a cooperating nipple-engaging gun.

2. A lubricant-receiving nipple comprising, in combination, a body having a threaded portion adjacent its discharge end for engagement with a nipple-supporting part, said body having its portion of greatest diameter adjacent the centre of the nipple, said portion of greatest diameter presenting relatively rugged steep pitch threads, said threads presenting flattened portions for engagement by a wrench, and said body adjacent the lubricant-receiving end of the nipple having a portion presenting a relatively smooth peripheral surface of sufficient length for engagement with a sealing washer on a cooperating nipple-engaging gun.

3. A lubricant-receiving nipple presenting a threaded portion adjacent one end for engagement with a nipple-supporting part, a steep pitch threaded portion presenting relatively rugged threads for engagement by a lubricant supply element, said threads presenting diametrically opposite flattened portions for engagement by a wrench.

4. A lubricant receiving nipple for use in injecting grease or oil under relatively high pressure into machine bearings having a body provided with an open ended, longitudinal bore, the lateral walls of said body being imperforate, said bore having a valve therein, said body being spun over to form a seat for said valve facing inwardly of said bore, said bore also having therein a helical spring in engagement wth said valve, said spring extending substantially to the other end of said bore, said bore at the last mentioned end being spun over to provide an annular shoulder forming an abutment for said spring, said spring being so constructed as to be under initial tension when in engagement with said shoulder and said valve, said body at one end thereof being formed with exterior threads for engagement with cooperating internal threads on a lubricant receiving orifice, said nipple at the opposite end thereof being formed with an exterior cylindrical surface of material length and with a substantially flat end face, said nipple at an intermediate portion thereof being formed with rugged, steep pitched, triple screw threads for engagement with a coupling member, said screw threaded portion being flattened for engagement by a wrench or the like.

In testimony whereof, I have signed my name to this specification.

HOWARD J. MURPHY.